United States Patent
Swingle et al.

(10) Patent No.: US 7,609,822 B2
(45) Date of Patent: Oct. 27, 2009

(54) METHODS AND APPARATUS FOR IMPLEMENTING VOICE MESSAGING USING E-MAIL

(75) Inventors: Loren Swingle, Norwalk, CT (US); Craig L. Reding, Midland Park, NJ (US); John Reformato, East Meadow, NY (US); Jayant M. Naik, Stamford, CT (US); Robert C. Baruch, Rising Sun, MD (US)

(73) Assignee: Telesector Resources Group, Inc., New York, NY (US)

( * ) Notice: Subject to any disclaimer, the term of this patent is extended or adjusted under 35 U.S.C. 154(b) by 434 days.

(21) Appl. No.: 11/548,423

(22) Filed: Oct. 11, 2006

(65) Prior Publication Data

US 2007/0127632 A1 Jun. 7, 2007

Related U.S. Application Data

(62) Division of application No. 09/785,223, filed on Feb. 16, 2001, now Pat. No. 7,136,461.

(51) Int. Cl.
*H04M 1/64* (2006.01)
(52) U.S. Cl. .................... 379/88.25; 379/88.17
(58) Field of Classification Search .......... 379/67.1, 379/88.12, 88.13, 88.14, 88.17, 88.24, 88.25
See application file for complete search history.

(56) References Cited

U.S. PATENT DOCUMENTS

| | | | |
|---|---|---|---|
| 5,568,540 A | 10/1996 | Greco et al. | 379/89 |
| 5,608,786 A | 3/1997 | Gordon | 379/100 |
| 5,608,874 A | 3/1997 | Ogawa et al. | 395/200.15 |
| 5,675,507 A | 10/1997 | Bobo, II | 364/514 R |
| 5,717,742 A | 2/1998 | Hyde-Thomson | 379/88 |
| 5,754,636 A | 5/1998 | Bayless et al. | 379/142 |
| 5,870,454 A | 2/1999 | Dahlén | 379/88.14 |
| 5,870,549 A | 2/1999 | Bobo, II | 395/200.36 |
| 5,925,101 A | 7/1999 | Bayless et al. | 709/219 |
| 5,951,638 A | 9/1999 | Hoss et al. | 709/206 |
| 5,991,382 A | 11/1999 | Bayless et al. | 379/136 |

(Continued)

OTHER PUBLICATIONS

G. Vandreuil and G. Parsons, Network Working Group Request for Comments: 2421, "Voice Profile for Internet Mail—version 2", Sep. 1998, downloaded from: http://www.ietf.org/rfc/rfc2421.txt?number=2421 on Jan. 29, 2001, pp. 1-56.

*Primary Examiner*—Olisa Anwah

(57) ABSTRACT

Methods and apparatus for controlling and retrieving messages from multiple voice mail systems used by a single individual are described. A voice messaging retrieval and forwarding (VMRAF) system checks a subscriber's voice message systems for messages, retrieves the messages and forwards them to the subscriber as attachments to E-mail files. E-mail replay messages are used to control deleting of the messages from the original systems. Prompt messages played to callers by different voice messaging systems before they leave a message can be updated automatically. This is done by indicating to the VMRAF system when one or more prompt messages are to be updated and which messages, from a set of prerecorded messages, are to be loaded into the voice message systems to replace the existing prompt messages. Accordingly, the VMRAF system facilities message retrieval and the updating of prompt messages, e.g., on a preselected schedule or at preselected times.

9 Claims, 10 Drawing Sheets

U.S. PATENT DOCUMENTS

| | | | |
|---|---|---|---|
| 6,026,158 A | 2/2000 | Bayless et al. | 379/355 |
| 6,035,018 A * | 3/2000 | Kaufman | 379/88.17 |
| 6,047,054 A | 4/2000 | Bayless et al. | 379/202 |
| 6,061,718 A | 5/2000 | Nelson | 709/206 |
| 6,085,231 A | 7/2000 | Agraharam et al. | 709/206 |
| 6,100,873 A | 8/2000 | Bayless et al. | 345/150 |
| 6,134,313 A | 10/2000 | Dorfman et al. | 379/201 |
| 6,138,036 A | 10/2000 | O'Cinneide | 455/557 |
| 6,138,096 A | 10/2000 | Chan et al. | 704/235 |
| 6,138,146 A | 10/2000 | Moon et al. | 709/206 |
| 6,148,329 A | 11/2000 | Meyer | 709/206 |
| 6,151,491 A | 11/2000 | Farris et al. | 455/412 |
| 6,154,465 A | 11/2000 | Pickett | 370/466 |
| 6,161,007 A | 12/2000 | McCutcheon et al. | 455/412 |
| 6,167,253 A | 12/2000 | Farris et al. | 455/412 |
| 6,173,259 B1 | 1/2001 | Bijl et al. | 704/235 |
| 6,175,616 B1 | 1/2001 | Light et al. | 379/88.14 |
| 6,175,858 B1 | 1/2001 | Bulfer et al. | 709/206 |
| 6,580,787 B1 * | 6/2003 | Akhteruzzaman et al. | 379/88.22 |
| 7,403,599 B2 * | 7/2008 | Amin | 379/88.14 |

* cited by examiner

METHODS AND APPARATUS FOR IMPLEMENTING VOICE MESSAGING USING E-MAIL

FIELD OF THE INVENTION

The present invention is directed to voice message systems and, more particularly, to methods and apparatus for implementing and controlling one or more voice messaging systems.

BACKGROUND OF THE INVENTION voice message systems, e.g., answering machines and voice mail systems, are commonplace in the modern communications oriented world. Known voice messaging systems are frequently controlled by calling the voice messaging system, entering a password, and then selecting from various options. Password entry and option selection is normally achieved using DTMF tones generated in response to pressing keys on a telephone keypad. Support for DTMF control allows messages to be retrieved or deleted from a remote location via a telephone call to the voice messaging system.

Voice message systems usually provide the user the opportunity to record a message, referred to herein as a prompt message, that will be played to a calling party when the messaging system responds to a call. Recording of prompt messages can normally be done locally at the answering system or remotely via a telephone call placed to the answering system.

Individuals today frequently use multiple voice message systems, e.g., one at home and another one at work. As the result of using multiple voice message systems an individual is confronted with the problem of having to check two or more distinct voice message systems to determine if there are any waiting messages. Calling multiple voice messaging systems to retrieve messages can be time consuming. Thus, the need to contact multiple messaging systems and the time associated with such operations discourages some voice messaging system users from frequently checking for messages.

The prompt message which is presented to a calling party by a voice messaging system is often used to notify a calling party about when and how long the called party will be away from the called location and/or when the called party will be checking for recorded messages. For such information to be useful, the prompt message must be updated to reflect changes in a user's schedule, planed absences from the office and/or other information. In many systems, in order to change a prompt message, a user of the system must record a new message. The process of recording messages, combined with the time associated with accessing a voice mail system to update a prompt message, discourages many users from updating and/or changing their prompt messages on a timely basis.

Frequently, users of voice message systems forget to update their prompt messages to reflect planned trips, the fact that they returned from a trip, or other circumstances that render an existing prompt message inappropriate or out of date. Sometimes the failure to keep a prompt message current is the result of an unintentional oversight. In other cases, the answering machine user finds it too inconvenient to contact one or more answering systems and update the prompt messages stored therein in a timely manner.

In addition to using voice messaging systems, many people also use E-mail systems. E-mails can be sent over electronic communications networks such as, e.g., the Internet and/or corporate intranets. Files may be attached to E-mails. As is known in the art, audio signals, e.g., speech and music, can be digitized and stored in an audio file for later retrieval and playback. Such files can be sent as E-mail attachments. It is also possible to attach a text file to an E-mail message or to incorporate text into the body of an E-mail message.

Various audio file formats are known with one common format being a .wav format. Audio files saved in a .wav file format are frequently indicated by use of a ".wav" file extension at the end of the file name.

Known E-mail systems can be set to provide notifications of received E-mail messages to the message recipient, to detect when an E-mail message is accessed by the recipient, and to automatically provide a reply message to the sender indicating that the E-mail message was accessed by the recipient. As in the case of voice message systems, a single individual may use multiple E-mail systems at one time.

In view of the above discussion, it becomes apparent that there is a need for improving the way in which a user interacts with voice message systems. In particular, there is a need for improving the way in which voice messages are retrieved by an individual who uses multiple messaging systems. There is also a need for improving the manner in which prompt messages used by voice messaging systems are updated. It is desirable that at least some improved voice messaging methods and apparatus be capable of working in conjunction with various E-mail services.

SUMMARY OF THE INVENTION

The present invention is directed to methods and apparatus for implementing messaging systems. The system of the present invention uses a novel voice message retrieval and forwarding (VMRAF) system, in conjunction with voice messaging and computer systems, to retrieve messages from various voice messaging systems and then to provide the retrieved voice messages to a user's computer, e.g., via Internet Protocol (IP) packets. In one particular embodiment, retrieved voice messages are sent as audio file attachments to E-mail messages.

The voice messaging systems from which messages are retrieved normally include one or more voice messaging systems which are distinct, i.e., not directly integrated with, the VMRAF system. The voice messaging systems accessed on a user's behalf by the VMRAF system may be physically remote from the VMRAF system, e.g., located on different physical premises and/or in different buildings which may be miles apart from each other. The VMRAF system may be, and in various embodiments is, also remote from a user's computer system which receives the forwarded messages on behalf of the user. The VMRAF system can access a user's remote voice messaging system by way of a dial-up telephone connection, IP connection (where the accessed voice messaging system supports IP access and/or control), and/or other communications channels supported by a user's voice messaging system.

The IP packets representing retrieved voice messages may be communicated to a user's computer via the Internet or another network, e.g., Intranet, capable of transporting IP packets between the VMRAF system and the user's computer.

Conventional answering machines and private branch exchange (PBX) based voice messaging systems are examples of the types of voice messaging systems which can be used with the VMRAF system of the present invention. Computer systems which support E-mail and the playing of audio files are examples of computer systems which are well suited for use with the VMRAF system of the present invention.

The VMRAF system of the present invention stores information on voice messaging systems used by each VMRAF system service subscriber. The stored information includes information used to access and retrieve the subscriber's voice messages, e.g., the telephone number or IP address of each voice messaging system, the password to be used for system access, and information on the sequence and value of signals, e.g., DTMF tones or other signals, which must be sent to the voice mail system to retrieve and/or otherwise manipulate, e.g., delete, the subscriber's messages.

The VMRAF system of the present invention includes circuitry for interfacing with a public switched telephone network (PSTN) allowing it to access voice mail systems by placing calls to said systems. Thus, in various embodiments, voice mail messages for subscribers are retrieved in accordance with the present invention over audio communications channels, established over the PSTN. The connection between the VMRAF system and the voice messaging system or systems from which messages are retrieved may include analog signal lines suitable for voice communications.

Since most existing voice messaging systems, including traditional answering machines, are designed to support remote access and retrieval of messages via the PSTN, the VMRAF system can interact with most existing voice mail systems without the need to make modifications to such systems.

In addition to including circuitry for supporting communications over the PSTN, the VMRAF system of the present invention includes circuitry, e.g., a network interface card, high speed modem, or other device for sending and receiving communications signals, e.g., E-mail messages and other signals sent using IP packets, over a digital communications network such as a corporate intranet or the Internet. Thus, the VMRAP system can access voice messaging systems which support IP interfaces using a communications channel such as the Internet or an Intranet.

In addition to the NIC and/or modem, the VMRAF system also includes circuitry and/or software used to digitize retrieved voice messages and to store the digitized audio in electronic files, e.g., one per retrieved message. In accordance with the present invention retrieved messages in the form of digital audio files are transmitted to the subscriber using IP packets, e.g., as E-mail messages which include the retrieved message as an audio file attachment. Thus, in accordance with the present invention retrieved messages may be forwarded to a subscriber automatically, e.g., as an E-mail attachment.

The user can configure the VMRAF system to retrieve and forward messages on a schedule selected by the user. Thus, once a user configures a schedule, retrieval and forwarding of messages from multiple remote systems will occur automatically, without the need for further action on the user's part.

In the above described manner, a subscriber can have voice mail messages retrieved from multiple answering services on a periodic basis and have the messages forwarded by E-mail. The subscriber can listen to the voice messages using a conventional E-mail system with an audio file player. Accordingly, a user of the VMRAF system does not need any specialized computer/telephony hardware on his/her computer and merely needs the ability to retrieve E-mails and play audio files in a manner already supported by a large number, if not the majority, of home and office computers in use today.

As is known in the art, E-mail systems can support instant messaging when the user is connected to his/her E-mail provider. Alternatively, when using what is known as a POP3 mailbox to support E-mail, the user can configure his/her computer to retrieve E-mails at a periodic basis and/or upon command from the user. Notably, once the user's E-mail system is properly configured to retrieve E-mail messages on a periodic or continuous basis, the user need not take any further action to receive E-mail messages. In such a case, once VMRAF and E-mail system configuration is completed, retrieval and delivery of voice messages to a user's computer from one or more remote voice mail systems will occur automatically.

In addition to forwarding the retrieved messages by E-mail, the messages can be stored in the VMRAF system for retrieval by the subscriber via telephone access. In this manner, the user can contact the VMRAF system and retrieve messages collected from multiple voice mail systems used by the subscriber. Thus, use of the VMRAF system eliminates the need for a subscriber to individually check multiple voice mail systems used by the subscriber to see if there are waiting messages.

In accordance with one feature of the present invention, the subscriber's E-mail system provides reply messages to the VMRAF system. A reply message is sent to the VMRAF system when a subscriber accesses an E-mail message which includes a forwarded voice mail message. In such an embodiment, assuming the VMRAF system retains copies of the subscriber's voice messages for possible telephone retrieval, the VMRAF system deletes the stored audio file corresponding to the accessed E-mail message. Thus, when contacting the VMRAF system by telephone to retrieve messages, the subscriber will not be presented with voice messages that have already been reviewed via E-mail.

A subscriber can choose to have the VMRAF system leave original messages on the voice mail systems from which they were retrieved. If the retrieved message was left on the source voice mail system, in one particular embodiment in response to receiving an E-mail reply or other signal that a message forwarded by E-mail was accessed, e.g., opened, by the subscriber, the VMRAF system re-establishes contact with the voice mail system from which the forwarded message was originally retrieved. The VMRAF system then deletes the original message. In this manner, messages can be left on various voice mail systems used by a subscriber with the messages being automatically deleted by the VMRAF system once the subscriber has reviewed a forwarded copy of the message.

A subscriber can configure an E-mail program to automatically generate replies to E-mails upon a message being accessed. Alternatively, a subscriber can selectively respond to E-mails of voice messages with a reply indicating the message was accessed. Selective replies can be used to control the deletion of some messages from a source voice messaging system but not others. Selective replies, used to initiate deletion of messages from a source voice messaging system, are particularly beneficial where a voice messaging system with a single mailbox is shared by multiple users. For example, a VMRAF system user may wish to delete his retrieved messages from a home answering machine without having the VMRAF system delete messages intended for his spouse which were also retrieved and forwarded.

While E-mail messages and a standard E-mail program are one way of receiving messages from the VMRAF system, an alternative technique is to use a dedicated voice message over IP routine for interfacing with the VMRAF system. Using such a routine, the user may signal the VMRAF system to check various remote voice message systems while the user is still online. Waiting messages are retrieved from the source voice mail systems and forwarded to the subscriber, e.g., as files sent using IP packets. Using a computer running the voice mail routine, the subscriber can listen to the messages using the voice mail routine and indicate to the VMRAF system whether or not the message should be deleted. If a user indicates that a message should be deleted, the VMRAF system will reconnect to the voice message system which was the source of the message, if it is not still connected to the system, and delete the retrieved message from the source voice messaging system.

For purposes of managing individual accounts, subscribers can contact the VMRAF system via the Internet using, e.g., a conventional Web browser application such as Internet Explorer or Netscape Navigator or standard e-mail system. After suitable security checks, e.g., subscriber password verification implemented using a firewall routine, a subscriber is given access to his/her account. For each voice mail system used by the subscriber, the subscriber can enter a system identifier, the telephone number to be used to access the system, the password to be used to access the system, the frequency at which the system is to be checked for messages and information indicating whether or not messages should be deleted from the voice mail system upon retrieval by the VMRF system. The system type identifier identifies, e.g., the make and/or model of the voice mail system used by the subscriber, e.g., AT&T model XXXX answering machine. The system identifier may be selected from a list of voice messaging systems with which the VMRAF is programmed to interact. The list may be presented as a pop-up menu to the subscriber, from which the subscriber can select, when the subscriber attempts to enter the system identifier information. The frequency at which the system is to check for messages can be entered in a plurality of formats, e.g., set times at which messages are to be checked or an interval in minutes or hours which is to pass between each check for messages.

The VMRAF system of the present invention can be used to perform various voice mail management functions in addition to retrieving and deleting messages.

As discussed above, when a caller is connected to a voice message service, the caller is frequently presented with a prerecorded message, a prompt message, from the messaging service which prompts the caller to leave a message.

In one embodiment, the VMRAF system supports updating of prompt messages stored on various answering machines used by a subscriber. In accordance with the present invention, rather than sequentially contact a plurality of voice messaging machines and individually update the prompt message stored on each machine, a user can update a prompt message on the VMRAF system. The VMRAF system then loads the voice messaging systems indicated by the subscriber with the updated prompt message. Prompt messages can be provided by a subscriber to the VMRAP system as digital audio files. The digital audio files can be created by the subscriber's computer, e.g., using a microphone input and A/D converter, and forwarded to the VMRAF system, e.g., via the Internet. Alternatively, prompt messages can be communicated to the VMRAF system via a dial up telephone connection with the VMRAF system storing the prompt messages for future use.

In one particular embodiment, a user can store multiple prompt messages in the VMRAF system. Via an Internet connection the user can select from the set of stored prompt messages and indicate the answering systems used by the subscriber which are to be loaded with the selected prompt message. Once the information is received, the VMRAF system accesses the indicated answering systems and updates the prompt message stored in each machine by replacing the machine's existing prompt message with the prompt message selected by the subscriber. In this manner, frequent updating of prompt messages stored in multiple voice mail systems can be accomplished with minimal effort on the part of the VMRAF system service subscriber, A user can provide the VMRAF system with a schedule to be used to control updating of prompt messages. For example, a subscriber who is normally out of the office on Wednesdays can set the VMRAF system to change the prompt message on one or more voice mail systems on Wednesday morning and to reset the prompt message on Thursday morning automatically.

In various embodiments, the VMRAF system of the present invention includes speech recognition circuitry. A subscriber to the service can select, as a service option, for retrieved voice messages to be converted to text by the speech recognition circuitry and for the text message to then be forwarded by E-mail to the subscriber. Thus, text messages generated from retrieved audio messages can be provided to a subscriber. The audio to text feature of the present invention is particularly well suited for the hearing impaired or for individuals who plan to access their E-mail messages from systems which do not support the ability to play audio files.

In accordance with one feature of the present invention, VMRAF system service subscriber's can respond to voice mail messages by sending an E-mail reply to the VMRAF system. The E-mail reply includes the telephone number of the person to whom the subscriber is replying and a voice message, e.g., a reply message, attached as an audio file. In a particular exemplary embodiment, the telephone number of the destination party, e.g., the person to whom the subscriber is replying, is entered by the subscriber at the start of the subject field of the E-mail message.

Upon receiving the E-message from the subscriber with the telephone number and attached audio file, the VMRAF system of the present invention places a telephone call using the telephone number in the E-mail message. When the telephone call is answered the VMRAF system monitors for audio signals indicative of speech followed by silence. When the silence is detected, the VMRAF system plays the audio file attached to the E-mail message to the called party or the answering system which responded to the call. Once the message has been played, the subscriber is notified by E-mail that the audio reply message was delivered.

Thus, without using a telephone, a subscriber at a computer system can record an audio reply to a received message in an audio file; E-mail the audio file along with a destination telephone number to the VMRAF system; and have the VMRAF system deliver the message by placing a call to the indicated telephone number and then play the message to the called party.

Various additional features and advantages of the present invention will be apparent from the detailed description which follows.

DETAILED DESCRIPTION

As discussed above, the present invention is directed to methods and apparatus for implementing and controlling one or more voice messaging systems, e.g., multiple messaging systems used by an individual.

Figure 1:
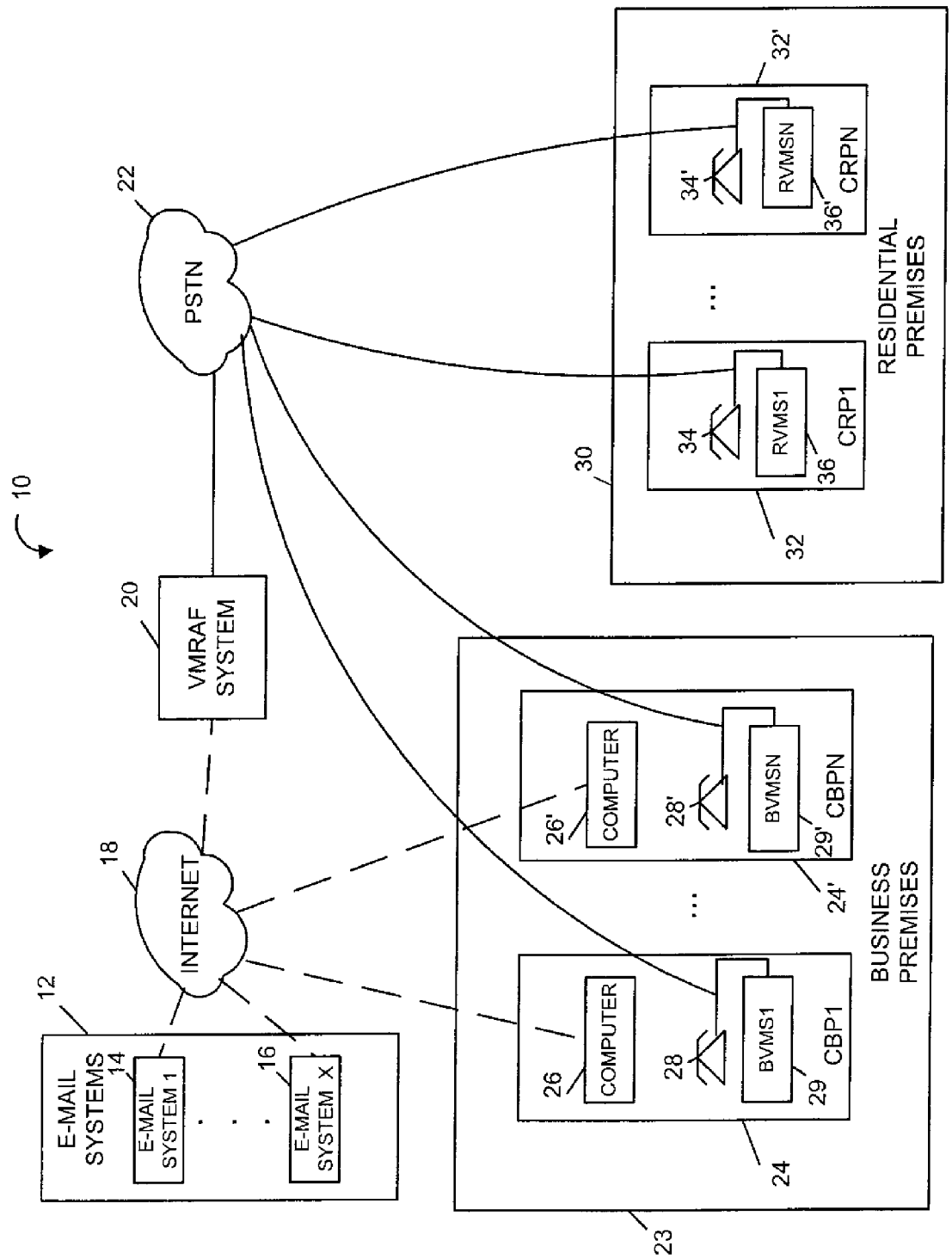
FIG. 1 illustrates a communication system implemented in accordance with an exemplary embodiment of the present invention.

A communications system 10 implemented in accordance with the present invention is illustrated in FIG. 1. As illustrated, the system 10 includes a plurality 12 of E-mail systems 14, 16, a plurality 23 of business premises 24, 24', e.g., offices, and a plurality 30 of residential premises 32, 32'. Each of the E-mail systems 14, 16 is coupled to Internet 18 thereby allowing individuals or devices to retrieve E-mail messages via the Internet 18. E-mail systems 12, 16 may be located at different physical locations but are shown grouped together for purposes of explanation.

Each of the business premises 24, 24' includes a computer 26, 26', a telephone 28, 28' and a business voice messaging system (BVMS) 29, 29'. The BVMSs 29 and 29' can be implemented as stand alone answering machines, as part of a PBX system, or using any one of a plurality of known voice messaging systems. Different types of BVMS 29, 29' may be used at different business premises. The telephone 28, 28' and BVMS 29, 29' located at each business premises 24, 24' is coupled to the public telephone switched network (PSTN) 22. Accordingly, callers to a business premise 24, 24' can leave messages on the BVMS 29, 29' located at the called business premise.

A user of a BVMS 29, 29' can control a BVMS from a remote location by placing a call to the user's business premise, following a preselected login procedure, e.g., entering an optional phone extension followed by a password, and then entering one or more commands. The phone extension, password and commands may be entered via DTMF signals. The DTMF signals may be generated, e.g., in response to the user depressing one or more keys on a telephone keypad. Once a user has logged into a DVMS, the user can retrieve messages, delete message, and create/update a prompt message to be presented to a caller prior to a caller leaving a message. Updating of a prompt message is normally achieved by recording a new prompt message which replaces an existing prompt message.

The computer 26, 26' located at each business premise is connected to the Internet 18 and can receive E-mail messages sent to the computer system user. As will be discussed further below, the computer systems 26, 26' can be set to automatically reply to received E-mail messages upon the message being accessed by the user of the computer 26, 26'. The computer systems 26, 26' also include the ability to play audio files which may be received as E-mail attachments.

Each of the residential premises 32, 32' includes a telephone 34, 34' and a residential voice messaging system (RVMS) 36, 36' which are coupled to the PSTN 22. Each RVMS 36, 36' can be accessed and controlled from a remote location via a telephone call in the same manner as described above in regard to the BVMS 29, 29'. While the residential premises 32, 32' are not shown as including computers, it is to be understood that the residential premises could include computers that support E-mail and playing of audio files.

Thus, the residential premises could also support the ability to receive E-mail messages and play audio files attached to received E-mail messages.

The VMRAF system 20 of the present invention is coupled to both the Internet 16 and the PSTN 22. In addition, the VMRAF system 20 can also be coupled to one or more computer networks (not shown), e.g., corporate intra-networks. Since the VMRAF system 20 is coupled to both the Internet 18 and PSTN 22, it can interact with voice message systems 29, 29' 36, 36' via the PSTN while also being able to interact with computers 26, 26' and E-mail systems 14, 16 via, e.g., the Internet 18. In addition, users of the VMRAF system 20 can interact with the system 20 via a computer and the Internet or via a telephone call placed over the PSTN 22. Thus, a user can interact with the VMRAF from any one of a plurality of locations which support telephone and/or computer Internet service.

Figure 2:
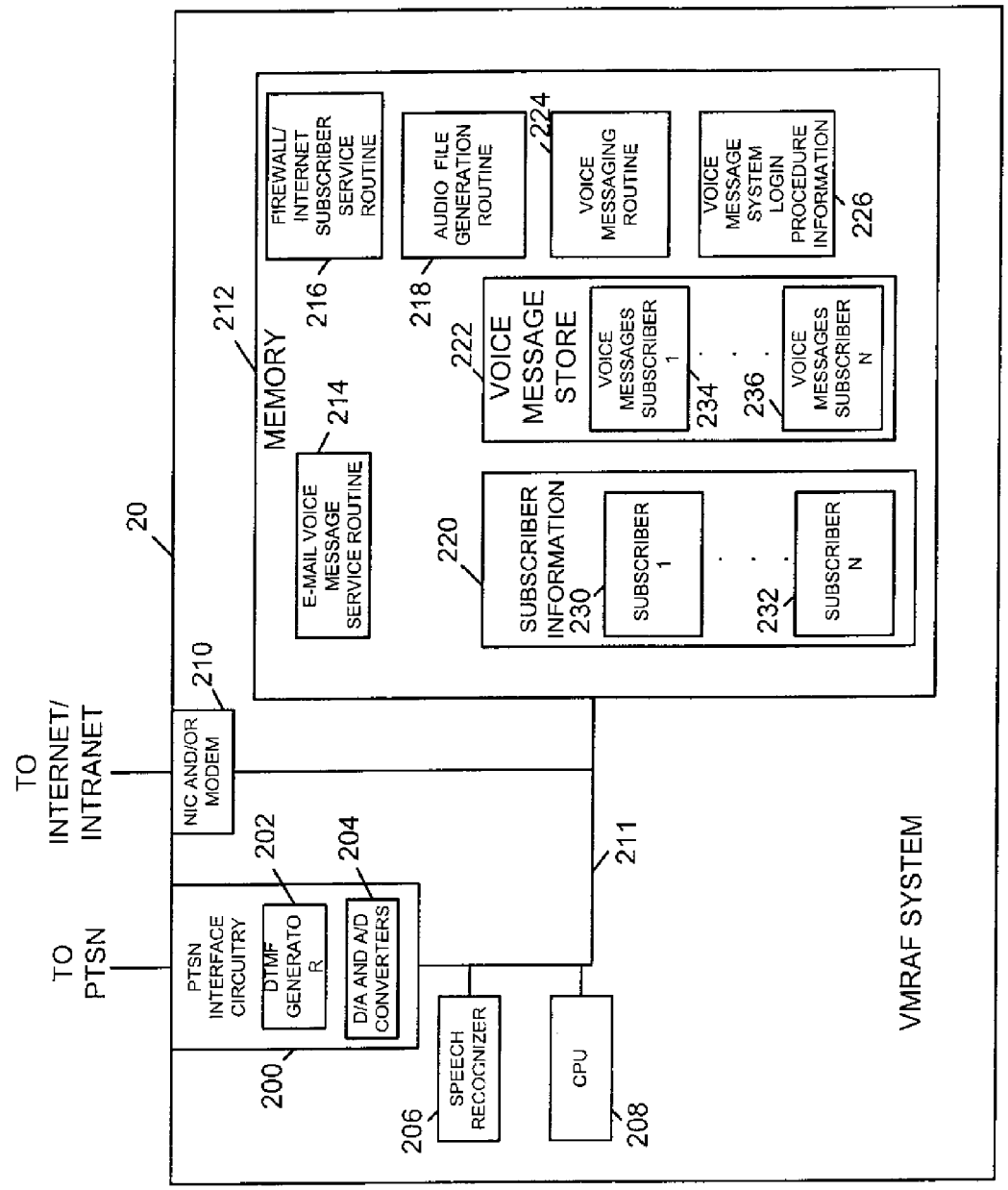
FIG. 2 is a block diagram of an exemplary VMRAF system implemented in accordance with the present invention.

FIG. 2 illustrates an exemplary VMRAF system 20 of the present invention. As illustrated, the VMRAF system 20 comprises a speech recognizer 206, a CPU 208, memory 212, network interface card (NIC) and/or modem 210 and PSTN interface circuitry 200 coupled together via bus 211. The NIC/modem 210 couples the VMRAF system 20 to the Internet 18 and, optionally to one or more intranets. Thus, the NIC/modem 210 the VMRAF system 20 enables the sending and receiving of E-mail messages over the Internet. It also makes it possible for VMRAF system service subscribers to access the VMRAF system via the Internet 18 using a conventional Web browser.

PSTN interface circuitry 200 couples the VMRAF system 200 to the PSTN. Interface circuitry 200 includes a DTMF generator 202. DTMF generator 200 is used for generating DTMF signals, e.g., to initiate calls and to control voice messaging systems 29, 29', 36, 36' when accessed by the VMRAF system 20. The PSTN interface circuitry 200 also includes D/A and A/D converters 204. The D/A converter is used to convert digital signals corresponding to, e.g., stored voice prompt messages, into analog audio signals which can be supplied to and recorded on voice messaging systems, e.g., for use as prompt messages. A/D converter circuitry is used for converting analog audio signals received via the PSTN to digital signals that can be processed by the VMRAF system 20 and stored in audio files when appropriate. As mentioned above, a caller can call into the VMRAF system 20 to record, e.g., a prompt message to be supplied to one or more VMS systems 29, 29' 36, 36'. In such a case, the A/D converter is used to convert audio input from the caller into a digital form that can be processed and used to create a digital audio file, e.g., a file representing a recorded prompt message.

Accordingly, PSTN interface circuitry 200 allows the VMRAF system 20 to access and control voice message systems via calls placed over the PSTN 22. Thus, the VMRAF system 20 can retrieve messages, delete messages, and record/update prompt messages on voice mail systems via the PSTN 22. In addition, the PSTN interface circuitry 200 also makes it possible for a subscriber to interact with the VMRAF system 20 via a telephone call to the system.

In accordance with one feature of the present invention, subscribers to the VMRAF system service are provided with retrieved messages in text, as opposed to audio format. In such a case, text versions of retrieved audio messages are sent to the service subscriber as part of an E-mail message or as a text file attachment to an E-mail message.

Speech recognizer 206 is used to perform speech recognition operations on received speech and to generate a text file including recognized text. Under control of CPU 208 speech recognizer 206 can generate text messages from retrieved voice mail messages. Such text messages are forwarded as text files attached to an E-mail message or included in the body of an E-mail message.

In the case where a subscriber prefers voice messages to be provided in audio format, retrieved messages are sent to the subscriber as one or more audio file attachments to an E-mail message.

CPU 208, under the direction of various routines stored in memory 212, controls the general operation of the VMRAF system 20. Routines stored in memory 212 include a firewall/Internet subscriber service routine 216, audio file generation routine 218, voice message system access routine 224, and an E-mail voice message service routine 214. Also included in memory 212 is a collection 220 of subscriber information and a voice message store 222. The collection of subscriber information 220 includes a subscriber record 230, 332 for each of the N subscribers serviced by the VMRAF system 20. Similarly, the voice message store 222 includes a separate collection 234, 236 of voice messages for each of the N subscribers serviced by the system 20.

Figure 7:
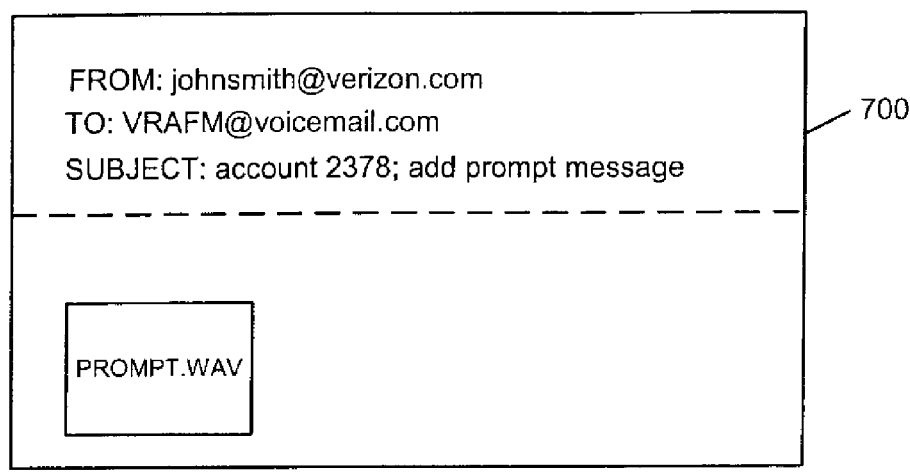
FIGS. 7, 8 and 9 illustrate various E-mail messages that may be generated in accordance with the methods of the present invention.

E-mail voice message service routine 214 is responsible for processing E-mails with attached audio files to be used as prompt messages, that are received from subscribers. FIG. 7 illustrates an E-mail 700 with an attached audio file to be used as a prompt message. When such an E-mail is received by the VMRAF system 20, voice message service routine 214 identifies from the subject line of the E-mail the account to which the prompt message is to be added. Assuming the sender's name corresponds to the name on the indicated account, the E-mail voice message service routine will store the attached file with the subscriber's information 230, 232 so that the subscriber can later use the supplied prompt message in updating the prompt message stored in one or more voice mail systems 29, 29', 36, 36'.

Firewall/Internet subscriber service routine 216 is responsible for controlling subscriber access via the Internet to the VMRAF system 20, It does this by, e.g., checking account and password information prior to giving a subscriber the ability to access and modify the subscriber's account information 230, 232. The routine 216 is also responsible for updating subscriber information relating to services selected and modified by the subscriber via the Internet. For example, routine 216 is responsible for creating message retrieval schedules and prompt message update schedules based on subscriber provided information.

Firewall/Internet subscriber service routine 216 interacts with voice messaging routine 224 to insure that the routine 224 has the information needed to provide each subscriber with the services requested by the individual subscriber.

Voice messaging routine 224 is the routine principally responsible for controlling the interaction with VMSs in the manner indicated by the subscriber. For example, voice messaging routine 224 controls the retrieval of voice messages from one or more VMSs 29, 29', 36, 36' used by the subscriber, the deleting of messages from the VMS systems from which they are retrieved, and the forwarding of messages to a subscriber via E-mail as either an attached audio file or an attached text file. The routine 224 is also responsible for recording and deleting messages from the VMRAF system's voice message store 222, e.g., in response to an E-mail reply message indicating that the subscriber accessed an E-mail or in response to the subscriber accessing the voice message store 222 by telephone.

Voice messaging routine 224 executes audio file generation routine 218 when a retrieved voice message needs to be converted into an audio file for storage and/or forwarding via E-mail.

In order to login and retrieve voice messages from various voice messaging systems, login procedure information is often required in addition to password, account, and phone extension information. Such login procedure information is obtained by accessing voice message system login procedure information 226 using VMS manufacturer and model information provided by the subscriber.

Figure 3:
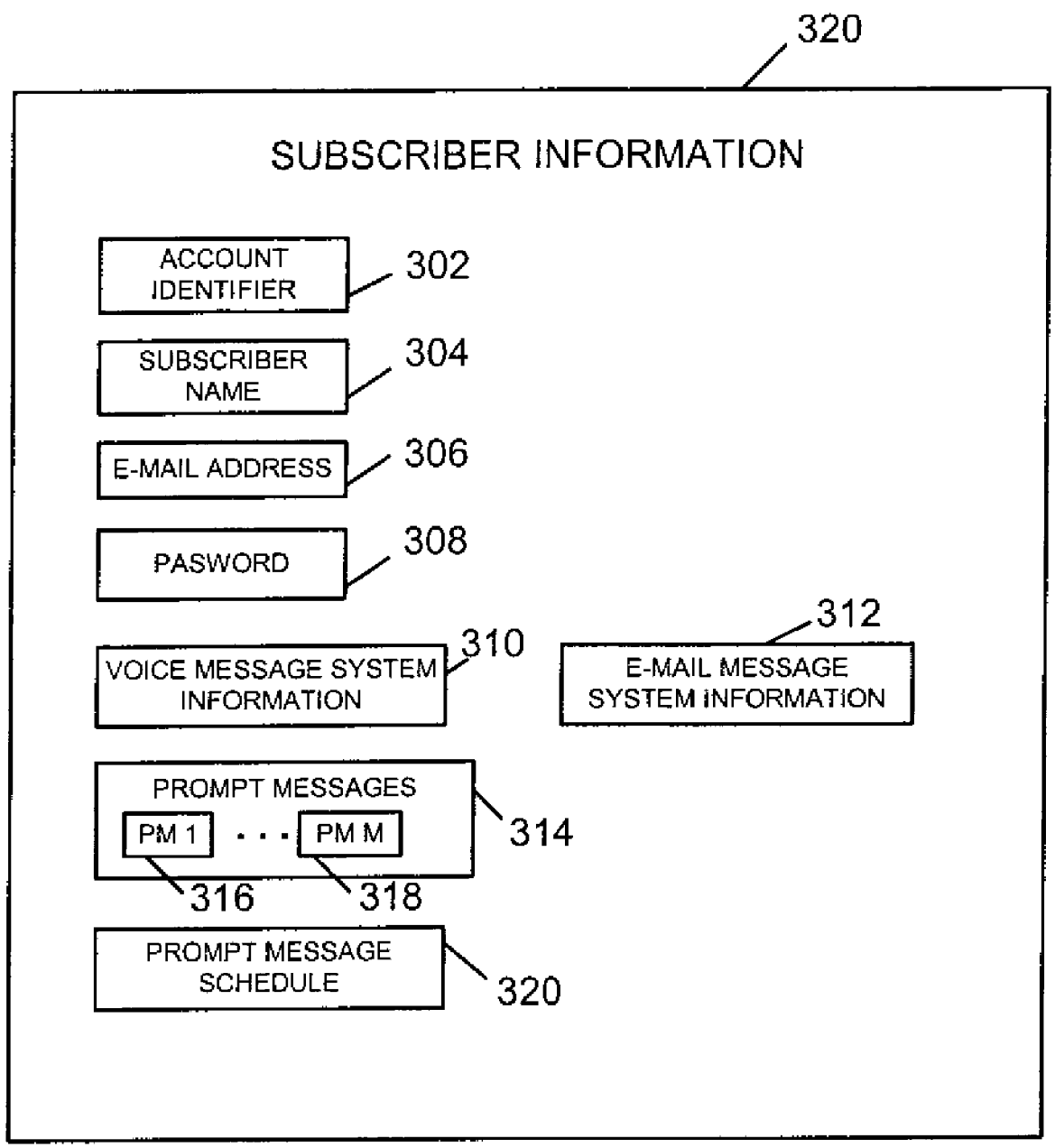
FIG. 3 illustrates a set of exemplary subscriber information which may be stored in the VMRAF of FIG. 2.
Figure 5:
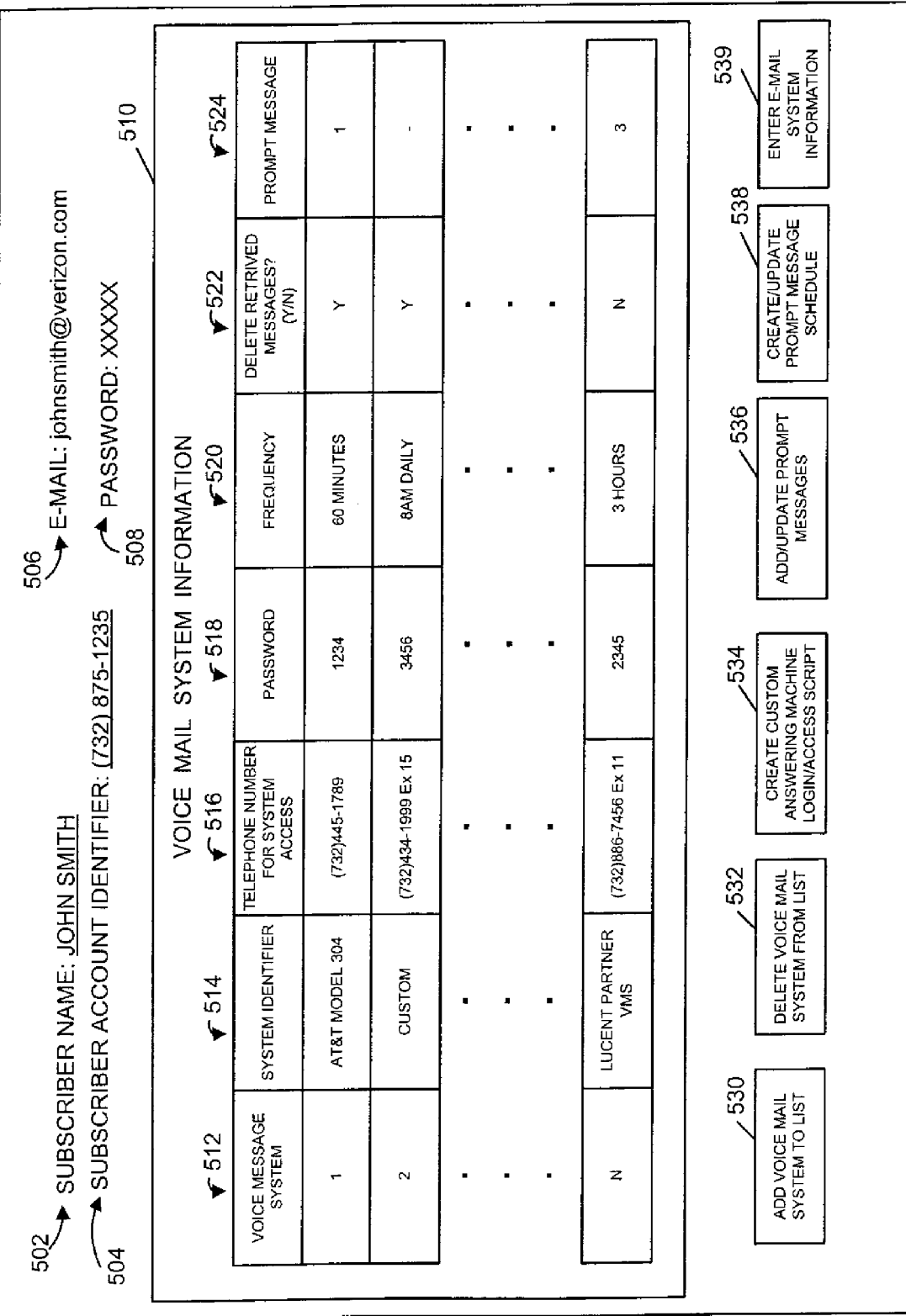
FIG. 5 illustrates an exemplary subscriber account management screen used for managing a VMRAF system account from a Web browser application.

The information stored in each subscriber record will now be discussed with reference to FIG. 3. FIG. 3 illustrates an exemplary set of subscriber information 320 which may be used as one of the subscriber records 230 or 232. The subscriber information 320 includes an account identifier 302, the subscriber's name 304, E-mail address 306, voice message system information 310, E-mail message system information 312, a set 314 of prerecorded prompt messages 316, 318 in the form of audio files, and a prompt message schedule 320. E-mail message system information includes information on E-mail systems used by the subscriber and information on when E-mail messages should be retrieved and forwarded to the subscriber using E-mail address 306, The voice message system information 310 includes information on the voice messaging systems used by the subscriber, when they are to be checked for messages, and whether the messages are to be deleted upon retrieval. Voice message system information 310 may include additional information as will be discussed further below with regard to the subscriber account management screen shown in FIG. 5.

Prompt messages 316, 318 may be E-mailed to the VMRAF system via E-mail for future use or recorded by a subscriber calling the VMRAF system 20 and initiating a prompt message recording operation. Prompt messages 316, 318 can be deleted by a subscriber via Internet account control or by calling the VMRAF system 20 and making the appropriate account management selections via DTMF signaling.

Figure 4:
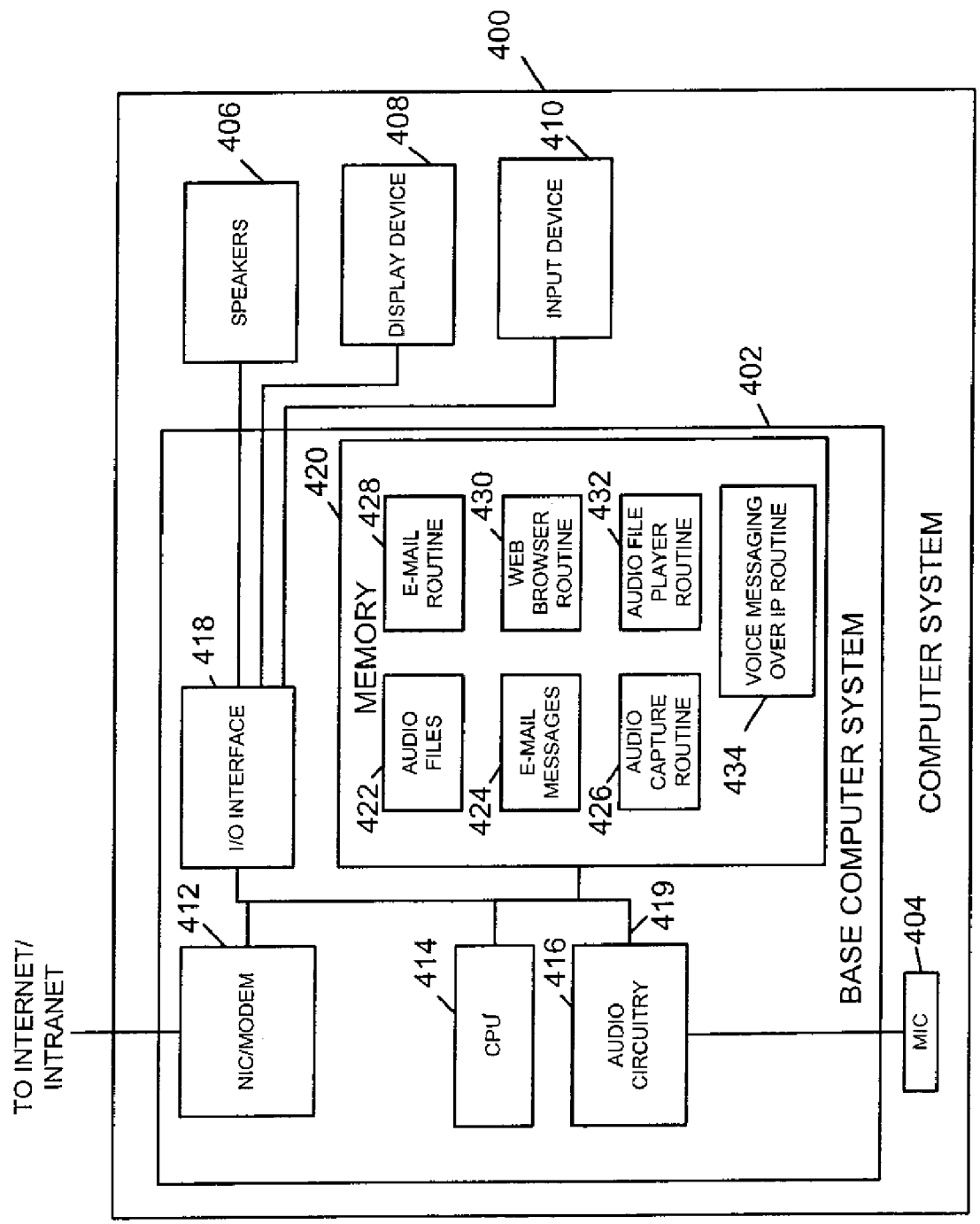
FIG. 4 illustrates a subscriber computer system implemented in accordance with the present invention.

Having generally described the VMRAF system 20 of the present invention, a computer system 400, which can be used by a VMRAF service subscriber to interact with the system 20, will now be discussed. FIG. 4 illustrates an exemplary computer system 400 which may be used as any one of the computer systems 26 or 26' shown in FIG. 1. As illustrated, the computer system 400 includes a base computer system 402 which is coupled to various input/output devices including speakers 406, a display device 408, input device, e.g., keyboard 410, and microphone 404. The base computer system 402 houses the main computer components, e.g., NIC and/or modem 412, central processing unit (CPU) 414, audio circuitry 416, I/O interface 418, and memory 420 which are coupled together via bus 419.

The NIC/modem 412 is used to couple the computer system 400 to the Internet 18 and/or an. intranet. I/O interface 418 converts input/output signals between a format used by the external devices, e.g., speakers 406, display device 408 and input device 410, and a format used by the base computer system's internal circuitry, e.g., CPU 414 and audio circuitry 416. The microphone 404 provides audio signals from a user of the computer system 400 to audio circuitry 416 which can, operating in conjunction with CPU 414, transform received audio signals into electronic audio files. The generated audio files are stored in memory 420.

CPU 414 controls the operation of the computer system 400 under control of routines 428, 430, 426, 432, and 434 stored in memory 420. In addition to storing various routines, memory 420 is used to store E-mail messages 424, including files attached thereto, as well as audio files 422 generated, e.g., from input from mic 404. E-mail routine 428 is used to control the receipt and generation of E-mails. In addition E-mail routine 428 can be set to detect when an E-mail message is accessed and to automatically generate and send a reply E-mail message when a received E-mail message is first accessed by the user of the computer system 400. Various known E-mail programs including Microsoft Outlook sold by Microsoft Corporation can be configured to serve as the E-mail routine 228.

Voice messaging over IP routine 434 can be used to interact with the VMRAF system 20 over an IP connection such as the Internet without the need for a Web browser or E-mail routine. Under control of routine 434, the computer system 400 can control the VMRAF system 20 to check for messages, delete retrieved messages, and otherwise control voice mail systems to which the VMRAF system 20 connects at the direction of the service subscriber.

Audio file player routine 432 is invoked by the E-mail routine 428 when a user attempts to access an audio file, e.g., a .WAV file received as an attachment to an E-mail message. Under control of CPU 414 executing audio file player routine 432, audio circuitry 416 processes a .WAV file to generate audio signals which are provided to the computer user via speakers 406. Thus, a user of the computer system 400 can listen to audio messages received as file attachments to E-mail messages.

Audio capture routine 426, when executed by CPU 414, causes speech received by audio circuitry 416 to be converted into an audio file. By executing audio capture routine 426, a user of the computer system can generate multiple audio files representing different prompt messages which can be used by an answering machine. Audio files including prompt messages are, in accordance with one feature of the present invention, are forwarded to the VMRAF system 20 via the Internet, e.g., as an E-mail attachment. The received prompt messages are loaded into one or more voice messaging systems in response to instructions received from a VMRAF system subscriber, e.g., the user of computer system 400.

When executed by a subscriber, Web browser routine 430 can be used to connect a subscriber via the Internet to the VMRAF system 20. Once connected, a user can login by providing an account identifier and a password. The account identifier may be, e.g., the subscriber's business or home phone number. Once the account and password information is verified, the subscriber is presented with a subscriber account management screen, such as the screen 500 illustrated in FIG. 5. From the subscriber's computer 26 the subscriber can manage various VMRAF system functions and services by modifying and/or entering information using the screen 500 and the computer system's Web browser.

The subscriber account management screen 500 has various fields used for displaying/entering data. At the top of the screen 500 the user is presented with a subscriber name field 502, a subscriber account identifier field 504, an E-mail address field 506 and a password field 508.

In block 510, near the center of screen 500, the subscriber is presented with a chart of voice message information. Each row of the chart corresponds to a different voice messaging system used by the subscriber. In the first column 512, a number is associated with each voice message system for subsequent reference and identification purposes. The second column 514 displays system identification information, e.g., the manufacturer and model information. The third column 516 lists the telephone number, including any phone extension, to be used in accessing the identified voice mail system. The fourth column 518 lists password information, e.g., a number to be supplied to the voice message system in the form of DTMF tones. The fifth column indicates when, e.g., the frequency or time, at which the identified voice message system should be checked by the VMRAF system 20 for waiting messages. The sixth column 522 includes an indicator (Y or N) as to whether messages should be immediately deleted from the voice message system upon retrieval by the VMRAF system 20. Finally, the seventh column indicates the prompt message, out of the plurality of prerecorded prompt messages stored for the subscriber, that is currently being used by the voice mail system.

For example, the first row of block 510 indicates that an AT&T model 304 voice messaging system is used by the subscriber, that the access telephone number for the VMS is (732) 445-1789, that the password for the system is 1234 and that the system should be checked very 60 minutes for voice messages. In addition the first row indicates that retrieved messages should be deleted from the identified voice messaging system and that the system is loaded with the first of the subscriber's stored prompt messages.

In the second row note that the phone number information includes a telephone extension number. Also note that the prompt message field is left blank. This indicates that the second voice message system associated with the subscriber does not use one of the stored prompt messages.

A user can make modifications to the voice mail system information illustrated in block 510 using his/her computer system to modify the displayed information. Changes in the displayed information are transmitted by the subscriber's Web browser to the VMRAF which then modifies its operations to reflect the updated information, e.g., revises message check schedules and/or loads voice message systems with different prompts necessitated by changes in the prompt message field of column 524.

The bottom of the screen 500 displays various buttons a subscriber can activate, e.g., by clicking on them. The first button 530 is used to add a voice mail system to the list in block 510. Activation of button 530 causes a new blank row to be added to the chart of voice mail system information. Button 532 can be activated to delete a previously highlighted row of voice mail system information from the chart. Button 534 can be activated to create a custom answering machine login/access script. This feature is useful for answering machines for which login protocol information is not already stored in VMRAF system 20. Add/update prompt messages 536 can be used to access or delete existing prompt messages and to add a new prompt message, e.g., by uploading a recorded message in the form of an audio file while connected to the VMRAF system 20.

Create/update prompt message schedule 538 can be activated to create a schedule for updating prompt messages as opposed to a one time prompt message update. By creating a schedule, prompt messages can be changed on a periodic basis, e.g., to reflect a person's weekly business schedule. Thus, VMS prompt messages can be updated by the VMRAF system 20 without the subscriber having to initiate the changing of the prompt messages every time.

Enter E-mail system information button 539 can be activated to enter information about E-mail systems the subscriber wishes to have the VMRAF retrieve E-mail messages from. Activation of button 538 causes a chart of E-mail system information similar to the voice mail system information of block 510 to be displayed to the subscriber for modification and updating purposes.

The information entered by the user via an Internet browser and screen 500 is stored in the subscriber's information record 230, 232 in the VMRAF system's memory 212.

Having described the hardware which comprises the VMRAF system 20 of the present invention, the voice message retrieval and forwarding method as well as the prompt message updating technique of the present invention will now be described with reference to FIG. 6. FIG. 6, which comprises the combination of FIGS. 6A, 6B, 6C, and 6D, illustrates various steps performed by the VMRAF system 20 to service a subscriber. The FIG. 6 flow chart relates to servicing a subscriber who has already provided the VMRAF system 20 with the voice message system information illustrated in block 510 of FIG. 5.

The method 600 begins in step 602 with various system initialization operations being preformed. Operation proceeds to step 604 wherein a subscriber's record 230, 232 is accessed, Then operation branches along four parallel paths. The first path begins with step 606 and supports VMS voice message retrieval and forwarding operations. The second path begins with step 608 and supports prompt message updating of voice message systems by the VMRAF system 20. The third path beings with step 652 which follows connector node 650. The third path supports sending an audio message, e.g., voice reply, to a party indicated by a telephone number provided in an E-mail with an attached audio file. The fourth processing path supports message retrieval and forwarding in response to signals, e.g., a message retrieval request, received from voice messaging routine 434. The fourth path beings with step 676 which follows connector node 675.

In step 606, the VMRAF system 20 identifies from the subscriber information 230, 232 the voice message systems (VMSs) to be serviced by the VMRAF system 20 in regard to message retrieval. Then, in step 610, a determination is made from the subscriber information as to the times or time intervals at which each VMS identified in step 606 is to be checked for messages. With the information from steps 606 and 610, the VMRAF system 20 proceeds to perform message retrieval operations on each VMS system that is to be serviced. Thus, steps 612 through 632 represent operations performed for each VMS being serviced, in regard to message retrieval, for the subscriber whose record was accessed.

From step 610 operation proceeds to step 612 wherein, at the time specified by the subscriber information, the voice message system associated with the subscriber is accessed to check for voice messages. In step 614, the VMRAF system 20 determines if a new message is waiting on the accessed VMS. If there are no new messages operation returns to step 612. However, if a new message for the subscriber is detected, operation proceeds to step 616.

In step 616, the waiting message is retrieved by the VMRAF system 20. Then, in 618 a determination is made from the subscriber information as to whether the subscriber has indicated that retrieved messages should be deleted from the accessed VMS or left on the VMS. If the retrieved messages are not to be deleted, operation proceeds directly to step 620. However, if retrieved messages are to be deleted from the accessed VMS, operation proceeds to step 621 wherein any retrieved messages are deleted from the accessed VMS. Operation then proceeds to step 620.

In step 620 retrieved messages are stored in the portion 234, 236 of VMRAF's memory 212 dedicated to storing the subscriber's retrieved voice mail messages. Then, in step 622 the retrieved voice mail messages are forwarded to the subscriber in the form of voice files attached to one or more E-mail messages. In one embodiment, a separate E-mail message is used to forward each voice mail message. If the user indicated a preference for text versions of voice messages, a text version of the message would be generated using automatic speech recognition techniques and forwarded via E-mail in step 622 instead of a voice file.

Operation proceeds from step 622 along two branches. The first branch involves a return to step 612 to recheck for messages at the designated time. The second branch which proceeds, from step 622 to step 624, involves monitoring for a reply to the E-mail message which included the retrieved voice message as an attached file.

In step 624, the VMRAF system 20 monitors for a reply message indicating that an E-mail message forwarding a retrieved voice message has been accessed. Upon detecting such a reply message operation proceeds to step 626 wherein any stored voice messages on the VMRAF system, which were attached to the accessed E-mail message, are deleted. In this manner, upon contacting the VMRAF system 20 by phone, the subscriber will not be presented with voice messages that have already been reviewed by accessing E-mail messages.

From step 626 operation proceeds to step 628 wherein a determination is made at to whether the voice messages attached to the accessed E-mail were deleted from the source VMS. If the messages were previously deleted from the source VMS operation proceeds directly to step 624. However, if the messages were not deleted from the source VMS, in step 630, the source VMS system is accessed and then, in step 632 the messages attached to the accessed E-mail are deleted from the source VMS. In this manner, the messages reviewed by the subscriber are automatically deleted from the source VMS if they were not previously deleted. Operation proceeds from step 632 to step 624.

Step 608 represents the start of the VMRAF system processing branch which addresses updating of prompt messages stored on VMSs used by a subscriber. In step 608, the VMRAF system 20 identifies from the stored subscriber information the VMSs associated with a subscriber which are to be provided with the VMRAF system's prompt message updating service. Steps 640, 642, 644 and 646 are then performed for each of the VMSs which are to receive the benefit of the prompt message updating service.

Operation proceeds from step 608 to steps 640 and 642 via connecting node 609. In step 640 the VMRAF system monitors for user input, e.g., input in the form of user modifications to the information in prompt message column 524 of subscriber account information screen 500. Such modifications indicate that the prompt message used by a VMS being serviced is to be changed. Upon detecting user input indicating that a prompt message on a VMS being serviced is to be changed, operation proceeds from step 640 to step 644.

In step 642 the VMRAF system 20 determines specified times or time intervals at which the VMS being serviced is to have its prompt message changed, i.e., updated. Step 642 is used where, e.g., the user specifies a prompt message updating schedule for a VMS. When a schedule or time has been determined for updating a VMS prompt message, operation proceeds from step 642 to step 644.

In step 644, upon the determined time for updating the prompt message or upon the user indicated time to change prompt message, the VMS whose prompt message is to be changed or updated is accessed by the VMRAF system 20. Then, in step 646, the accessed VMS is loaded with the prompt message stored in the VMRAF system that was indicated by the subscriber. With the new prompt message loaded into the VMS being serviced, operation proceeds to steps 640, 642 pending another update of the prompt message.

Since the user can select from a plurality of prerecorded prompt messages, different messages can be loaded into different VMSs at a specified time and the prompt message used by an individual VMS can be changed at different times automatically.

The process illustrated in FIG. 6 proceeds until halted by the VRAF system subscriber or the VRAF system is powered off.

Figure 8:
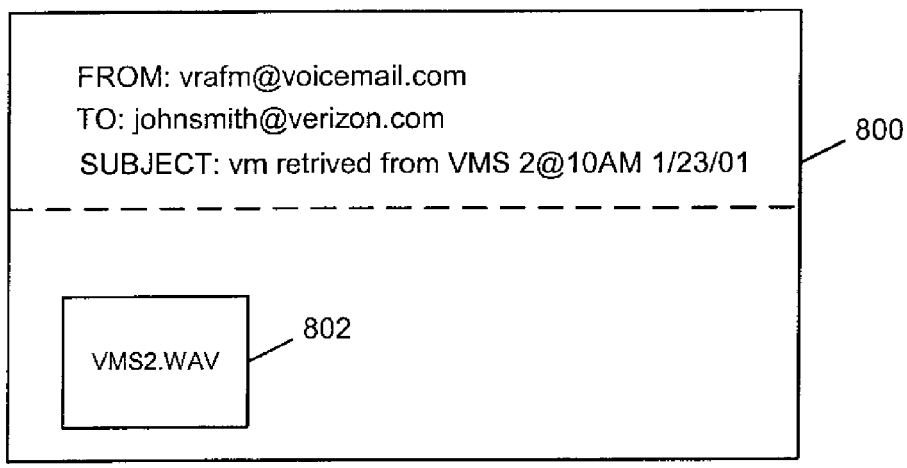

FIG. 8 illustrates an exemplary E-mail message 800 with a retrieved voice message in the form of an attached audio file. From the TO: field of the E-mail message 800 it can be seen that the message is directed to VRAFM system service subscriber having an E-mail address johnsmith@verizon.com. The subject field of the E-mail message 800 is used to indicate that the attached voice mail messages was retrieved from the second VMS listed in the subscriber's voice mail information at 10 AM on Jan. 23, 2001. The .WAV file extension indicates that the attached audio file 802, which includes a retrieved message, is in a .WAV file format.

Figure 6A:
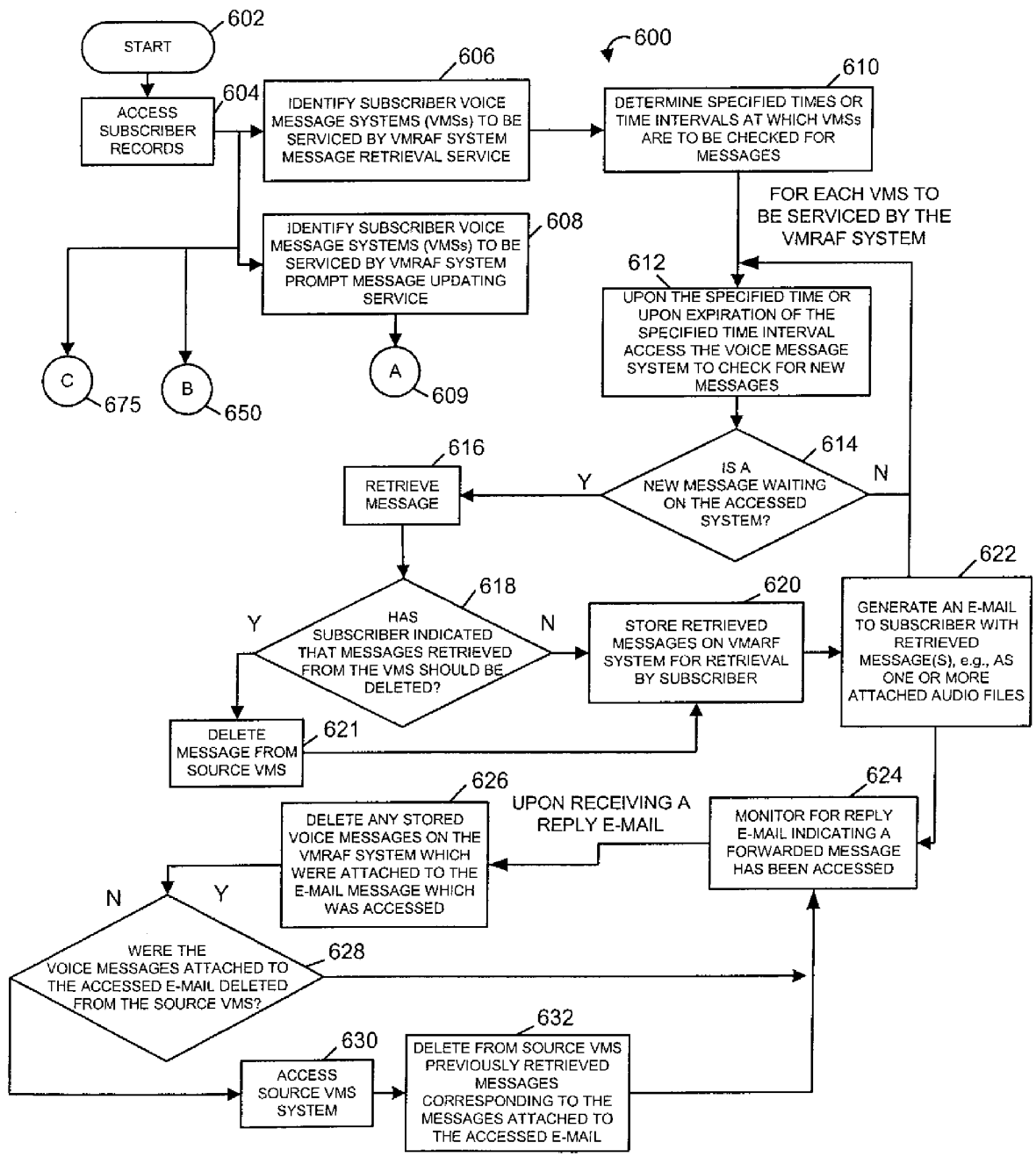
FIG. 6, which comprises the combination of FIGS. 6A, 6B, 6C, and 6D illustrates an exemplary method of VMRAF system operation.
Figure 6B:
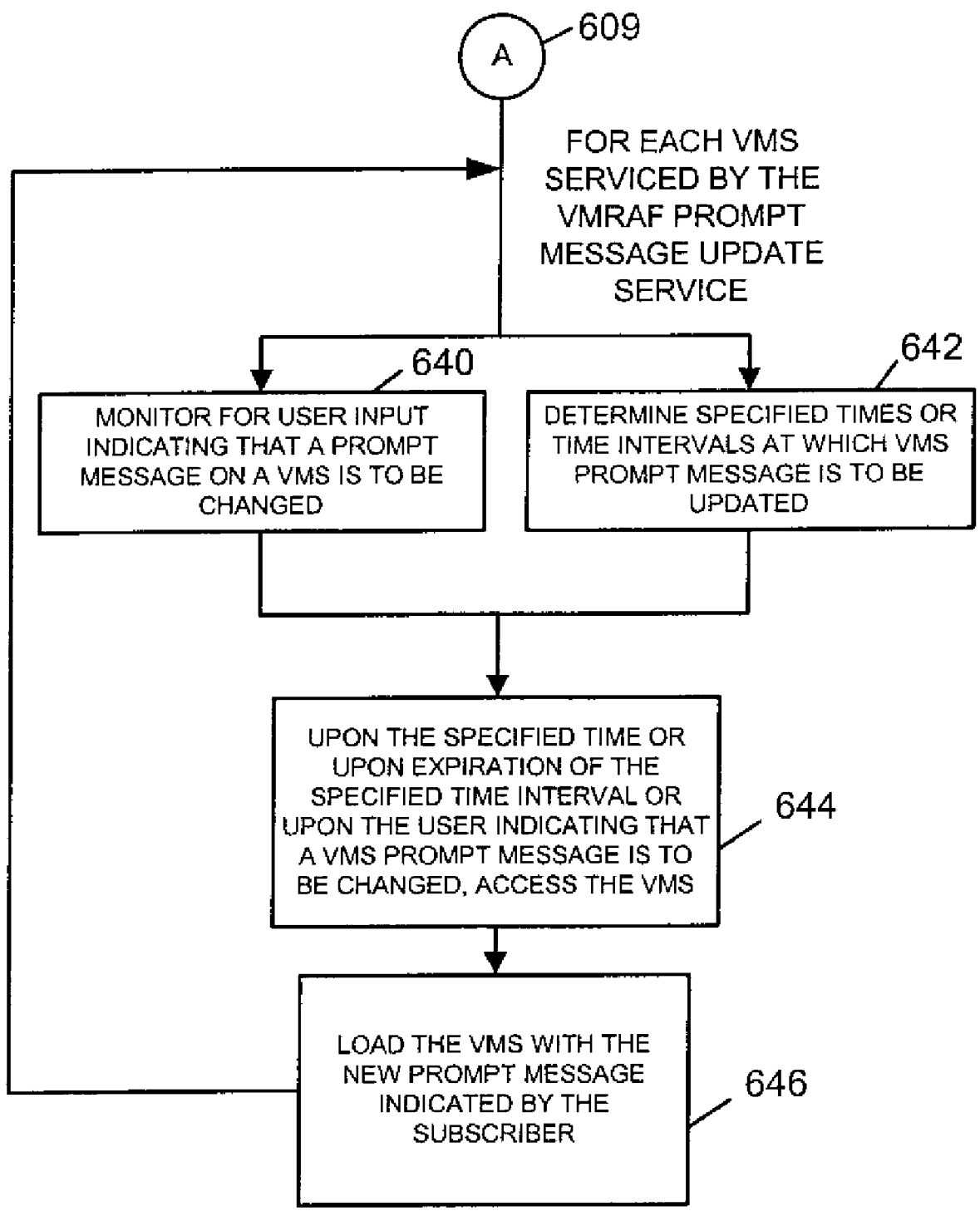
Figure 6C:
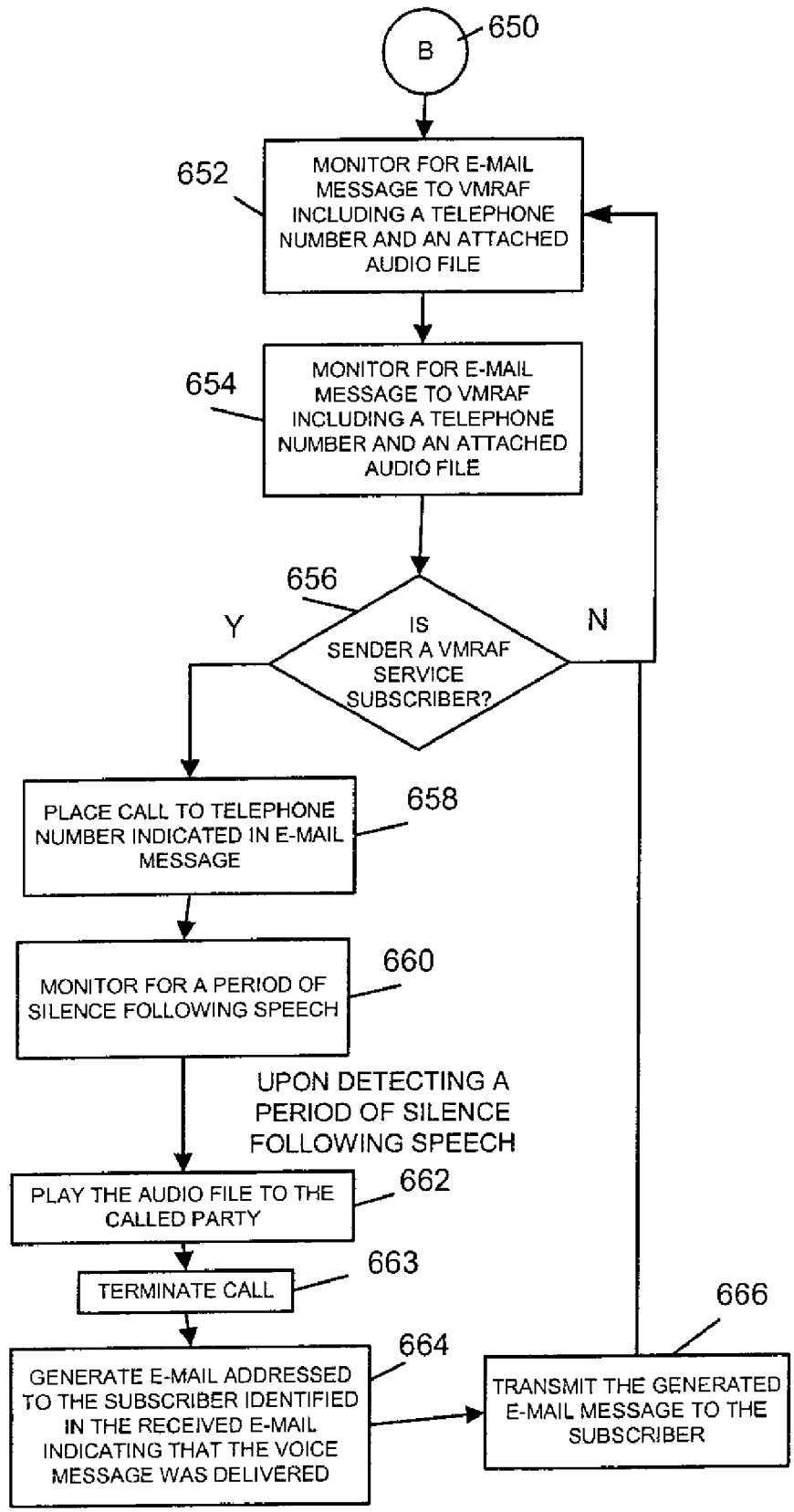

Operation along the third processing path, proceeding from step 604 by way of connection node 650, begins in step 652 of FIG. 6C. In step 652, the VMRAF system monitors for an E-mail message from a subscriber which includes a telephone number and an attached audio file.

Figure 9:
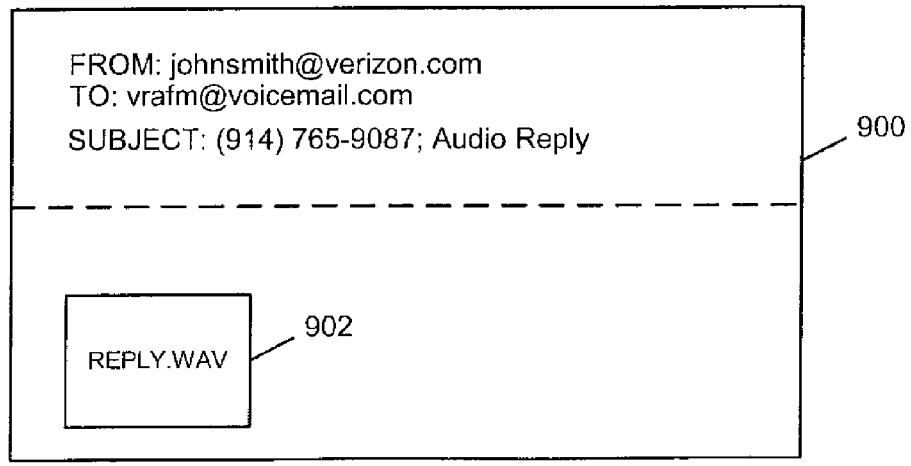

FIG. 9 shows an exemplary E-mail 900 which may be detected in step 652. Note that the E-mail message 900 includes a telephone number in the subject field and an attached audio file 902. The E-mail message 900 is addressed to the VMRAF system 20 and indicates in the FROM field the subscriber's E-mail address, which is known to the system 20 from the stored subscriber information 220.

When the monitoring operation of step 654 detects an E-mail message addressed to the VMRAP system 20, having a telephone number and attached audio file, operation proceeds to step 656. In step 656 the system 20 determines from the E-mail address of the sender if the detected E-mail message is from a VMRAF service subscriber. If the E-mail message is not from a service subscriber, operation proceeds once again to step 652.

However, it in step 656 it is determined that the E-mail sender is a VMRAF service subscriber, operation proceeds to step 658. In step 658, the VMRAF system places a telephone call to the telephone number supplied in the E-mail message. Then, in step 660, the VMRAF system 20 monitors for speech, followed by a period of silence, from the called party or answering system which answered the call. Various known techniques, e.g., techniques involving signal amplitude measurements, may be used to perform the speech and silence detection operation. Upon detecting the period of silence following speech, operation proceeds to step 662 wherein the audio file attached to the E-mail is played to the called party or answering machine which responded to the telephone call. Following playing of the message the VMRAF system terminates the call in step 663 and then proceeds to step 664. Alternative methods of determining when a message should be played for recording are available, such as through the use of intelligent voice recognition systems, pre-programming possible responses, etc.

In step 664, the VMRAF system 20 generates an E-mail message, addressed to the subscriber identified in the received E-mail message, indicating that the voice message attached to the E-mail was delivered. The generated E-mail may be a reply-to the received E-mail that included the audio file and telephone number.

After generation of the reply E-mail indicating delivery of the audio message operation proceeds to step 666 wherein the E-mail is transmitted, e.g., via the Internet 18, to the subscriber. Operation then proceeds to monitoring step 652.

Figure 6D:
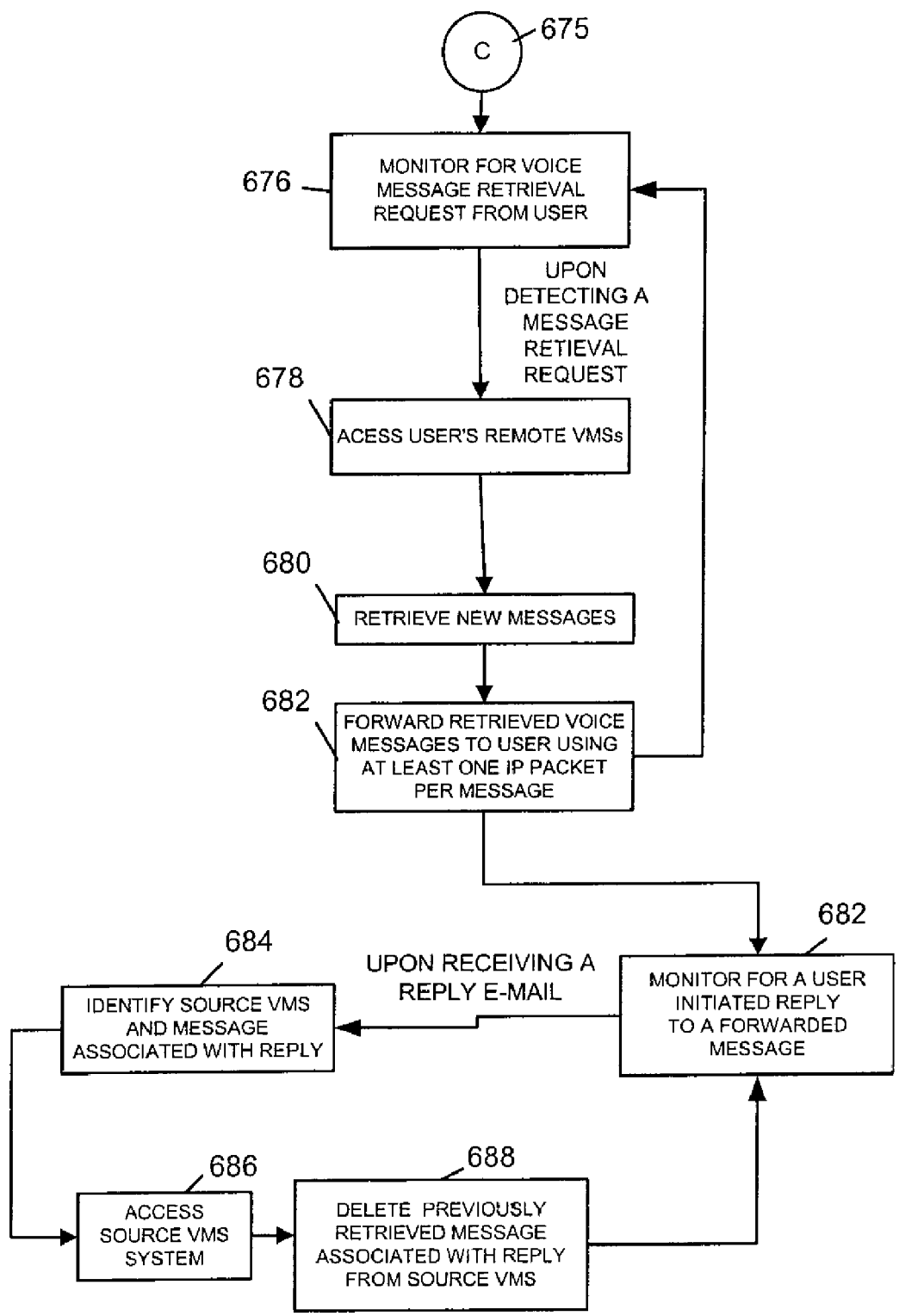

Operation along the fourth processing path, begins in step 676 of FIG. 6D, by way of connection node 675. In step 676, the VMRAF system 20 monitors for a voice message retrieval request from the user. Such a request may be sent by activating a retrieve voice message icon on a window displayed by voice messaging routine 434, on the user's computer system. Upon detecting a message retrieval request, e.g., received over the Internet as a set of IP packets, operation proceeds to step 678 wherein the voice messaging systems associated with the user who sent the request are accessed. Access of the voice messaging systems, which may be physically remote from the VMRAF system 20, may be via a telephone connection or an IP connection as discussed above. In step 680, new messages on the accessed voice message system(s) are retrieved. The retrieved voice messages are then forwarded to the user's computer in step 682, e.g., as a series of IP packets representing voice files. The received voice files are played to the user by the voice-messaging routine 434.

By clicking on a delete button displayed to the user, the user can signal to the voice messaging routine 434 that the message that is being played, or was just played, should be deleted. In response to such input from the user, the voice messaging routine 434 transmits a reply message to the VMRAF system 20 to initiate deletion of the message from the source VMS from which it was retrieved. The message may be in the form of an E-mail or other reply sent using IP packets and including sufficient information for the VMRAF system 20 to identify the message to be deleted. For example, the reply message may include a message recipient (service subscriber) identifier, VMS identifier, and message date and/or time.

After forwarding a message in step 682 operation proceeds once again to step 676. In addition, operation branches to step 682, wherein the VMRAF system 20 monitors for a user initiated reply to a forwarded message. Upon receiving a reply to a forwarded message, operation proceeds to step 684. In step 684 the VMRAF system 20 identifies the source VMS and voice message associated with the received reply. Then in step 686, the VMRAF system accesses the source VMS system if it is not still connected to it. Next in step 688, the VMRAF system 20 controls the source VMS to delete the stored copy of the forwarded E-mail. After deletion of the source copy of the previously forwarded message operation returns to step 682 wherein the system proceeds to monitor for additional signals from the subscriber's computer 26 or 26'

Some voice messaging systems support the use of message waiting indicators (MWIs), e.g., message waiting lights, on telephones. One standard for communicating MWI control information to a telephone switch is the Simplified Message Desk Interface (SMDI), described in Telecordia Technologies document titled "Simplified Message Desk Interface (SMDI)", Generic Requirements GR-283-CORE, Issue 1, November, 1999. SMDI MWI control messages may be supplied directly to the VMRAF system of the present invention or forwarded by another device. U.S. Provisional Patent Application Ser. No. 60/269,338, titled "METHODS AND APPARATUS FOR OBTAINING AND DISTRIBUTING VOICE MAIL INFORMATION" which is being filed on even date herewith and on which Craig L. Reding among others is identified as an inventor, is hereby expressly incorporated by reference. The Provisional Patent Application describes a system for forwarding SMDI message information to a VMRAF system via an IP network. When SMDI information is available, rather than periodically poll a VMS, the VMRAF system of the present invention can wait until a SMDI message indicates that a voice message is waiting for a VMRAF subscriber and then retrieve the waiting message. In addition, a SMDI signal to remove a MWI on a subscriber's line can be used to control deletion of messages stored for the subscriber on the VMRAF system of the present invention.

Numerous variations on the above described methods and apparatus are possible without departing from the scope of the invention.

The invention claimed is:

1. A method of using a voice message storage and retrieval system to update prompt messages on a plurality of voice message systems, comprising:

storing a plurality of prompt messages;
   operating the retrieval system to:
   receive information from a user identifying a first one of said prompt messages and indicating that the first one of said prompt messages should be loaded onto a designated one of said remote voice message systems;
   access the said remote voice message system; and
   control the said remote voice message system to store said first one of said prompt messages.

2. A method of updating prompt messages on a plurality of voice message systems, comprising:

storing a plurality of prompt messages;
   receiving information from a user identifying a first one of said prompt messages and indicating that the first one of said prompt messages should be loaded onto a first remote voice message system;
   accessing the first remote voice message system by placing a call to said first remote voice message system; and
   controlling the first remote voice message system to store said first one of said prompt messages by transmitting a DTMF signal to the first remote voice message system.

3. The method of claim 2, wherein the information received from the user includes scheduling information indicating the time at which the first one of said prompt messages should be loaded onto the first remote voice message system and when a second one of said prompt messages should be loaded onto the first remote voice message system, the method further comprising:

accessing the first remote voice message system when the schedule indicates that the second one of said prompt messages should be loaded onto the first remote voice messaging system; and
   controlling the first remote voice message system to store said second one of said prompt messages.

4. The method of claim 2, further comprising the step of:

receiving an E-mail message from said user including a prompt message as an attached audio file; and adding the prompt message in said attached audio file to said plurality of stored prompt messages.

5. The method of claim 1, wherein said step of receiving information from the user includes:

receiving said information from the Internet.

6. The method of claim 2, wherein the information received from the user includes information indicating when a second one of said prompt messages should be loaded onto a second remote voice messaging system, the method further comprising:

accessing the second remote voice message system when the information received from the user indicates that the second one of said prompt messages should be loaded onto the second remote voice messaging system; and
   controlling the second remote voice message system to store said second one of said prompt messages.

7. An apparatus for updating prompt messages on a plurality of voice message systems, comprising:

a memory device including a plurality of stored prompt messages;
   means for receiving information from a user, said information identifying one of said prompt messages stored in the memory and indicating that a particular one of said prompt messages should be loaded onto a particular one of said remote voice message systems;
   means for accessing said particular one of said remote voice message systems; and
   means for controlling said particular one of said remote voice message systems to store said particular one of said prompt messages.

8. The apparatus of claim 7, wherein the means for receiving information includes:

at least one of a modem and network interface card.

9. The apparatus of claim 7, wherein the means for accessing the said particular remote voice message system includes:

a DTMF signal generator.

* * * * *